United States Patent
Oiye et al.

[19]

[11] Patent Number: 5,898,270

[45] Date of Patent: Apr. 27, 1999

[54] MONOCOQUE STRUCTURE AND LARGE ELECTRODE BEADED ROB RE-ENTRANT SEALS FOR FLASHLAMP-PUMPED SOLID-STATE LASER FLASHLAMPS

[75] Inventors: George Oiye, Los Altos; Jose B Soberanes, San Jose, both of Calif.

[73] Assignee: ILC Technology, Inc., Sunnyvale, Calif.

[21] Appl. No.: 08/826,985

[22] Filed: Apr. 11, 1997

[51] Int. Cl.$^6$ ..................................................... H01J 61/04
[52] U.S. Cl. .......................... 313/570; 313/311; 313/631; 372/61; 372/87
[58] Field of Search ..................................... 313/311, 335, 313/357, 623, 624, 625, 631, 632, 570; 372/61, 62, 65, 87, 72

[56] References Cited

U.S. PATENT DOCUMENTS

| | | | |
|---|---|---|---|
| 3,675,068 | 7/1972 | Strauss | 313/217 |
| 4,559,472 | 12/1985 | Triebel et al. | 313/623 |
| 5,025,192 | 6/1991 | Okamoto | 313/623 |
| 5,369,329 | 11/1994 | Austad et al. | 313/284 |
| 5,374,872 | 12/1994 | Balaschak et al. | 313/623 |
| 5,569,978 | 10/1996 | Olye et al. | 313/631 |

*Primary Examiner*—Vip Patel
*Assistant Examiner*—Matthew J. Gerike

*Attorney, Agent, or Firm*—Thomas E. Schatzel; Law Offices of Thomas E. Schatzel A Prof. Corp.

[57] ABSTRACT

A pulsed high energy arc-tube flashlamp comprises a quartz flashlamp envelope that is about 2000 mm long and has an outside diameter of approximately forty-eight mm. Each end necks down to an outside diameter of about thirty-eight mm to accommodate an anode re-entrant seal assembly at one end and a cathode re-entrant seal assembly at the other end. Each anode and cathode comprises a beaded electrode rod of tungsten with an unusually large 0.25 inch diameter. A reflective metal paint or white oxide paint is added to the end necks to improve the lamp starting characteristics and to protect the cassette mounting o-ring and lamp cable junction box from radiation. A TEFLON shrink sleeve is shrunk over each outside end of the flashlamp envelope and such provides a small amount of cushion for the lamp mounts in the laser cassette. The monocoque body structure does not need separate lamp mounting bases, and thus overall provides a mechanically simpler and superior structure that is far more reliable. The prior art demonstrates that necking down glass envelopes of lamps is common practice, but here such necking down is limited to that diameter which just suits the external mounting base requirements. The re-entrant seal cup area provides a large volume reservoir for filling with RTV, which bonds the lead wire insulation to the quartz and provide cable support and additional electrical insulation to provide zero lamp insulation failure.

4 Claims, 3 Drawing Sheets

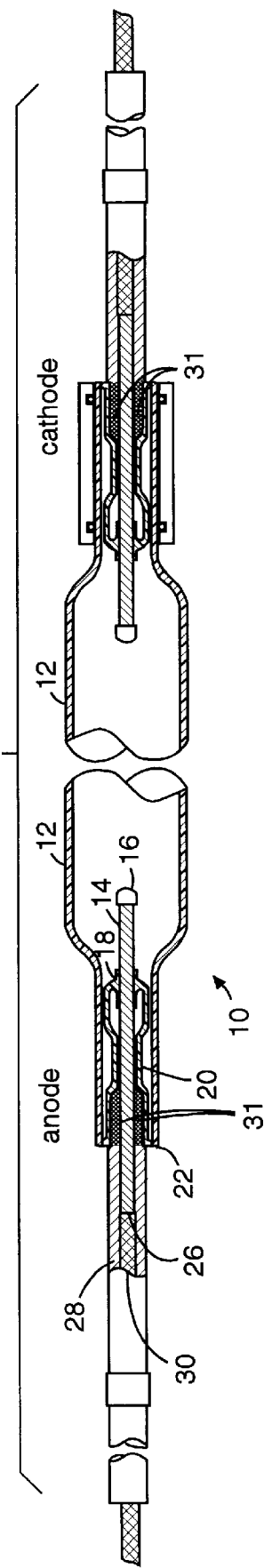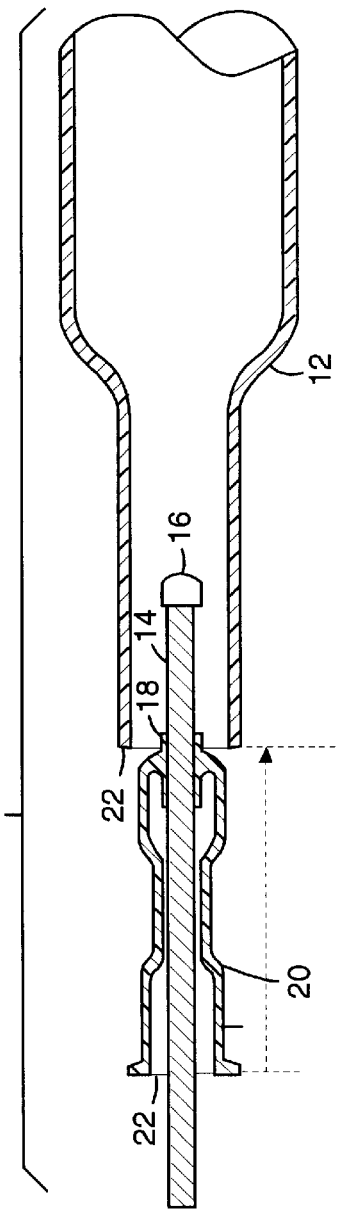

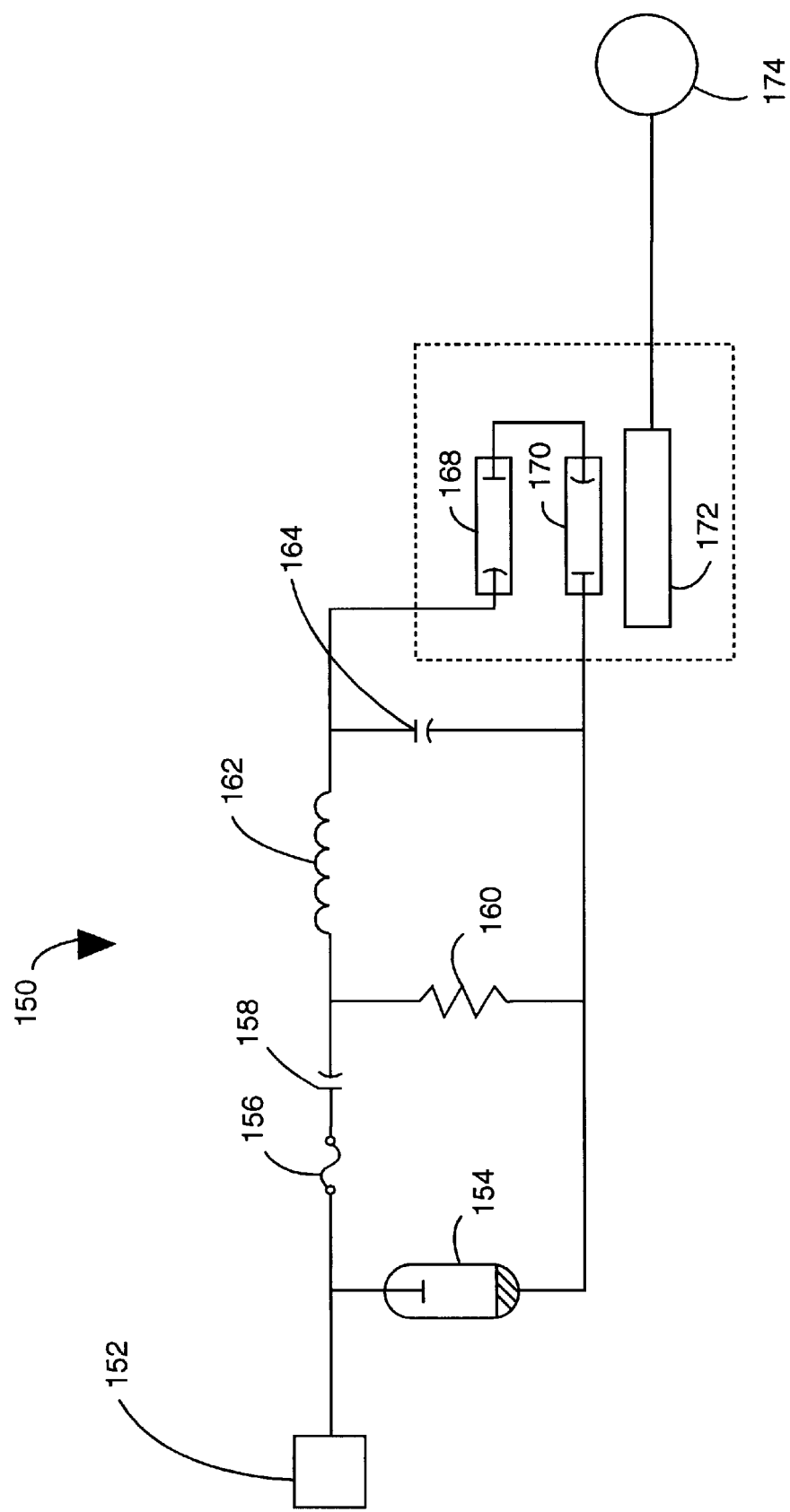

MONOCOQUE STRUCTURE AND LARGE ELECTRODE BEADED ROB RE-ENTRANT SEALS FOR FLASHLAMP-PUMPED SOLID-STATE LASER FLASHLAMPS

BACKGROUND OF THE INVENTION

1. Field of the Invention

The invention relates generally to pulsed high energy arc-tube flashlamps and more specifically to monocoque structures and re-entrant seals for pumped neodymium-doped glass laser flashlamps.

2. Description of the Prior Art

Very high power arc-tube flashlamps present several challenges to long life operation and acceptable low impedance levels. The National Ignition Facility (NIF) is due to be constructed by the United States Department of Energy (DOE) at Lawrence Livermore National Laboratory (LLNL) beginning in 1997. The NIF will use pulsed high energy arc-tube flashlamps to pump each of 192 laser beams that in turn are all converged on a target hohlraum loaded with a fusion fuel pellet. The solid-state lasers used to drive inertial fusion energy reactors must generate fusion-like, megajoule pulse output. Various conceptual and technological innovations were needed to overcome the limitations of the prior art, and thereby enable NIF design and construction to proceed.

A typical pulsed high energy arc-tube flashlamp for the NIF is a cylindrical quartz tube specified to mount in a laser cassette and have an overall length of about 2000 millimeters (mm), an arc gap length of about 1800 mm, and mounting ends that are about thirty-eight mm in diameter and ninety mm long. A large capacitor bank is used to deliver as much as 20,000 amps at 24,000 volts in a single thirty-two kilojoule pulse to each arc-tube flashlamp. Such currents generate tremendous magnetic fields and plasmas that hammer hard at the seals between the tungsten electrodes and the quartz glass envelope in the lamps. Prior art small diameter rod seal lamps and o-ring seal lamps have proven inadequate for such extreme applications.

Conventional lamps require external lamp mounting bases or structures, and so need extra parts that add to the overall cost. Such designs can be weak at the glass envelope necks of the pulsed high energy arc-tube flashlamp where the bending moments are concentrated. Prior art glass-to-metal seals in pulsed high energy arc-tube flashlamps have been complex and made manufacturing more difficult. Re-entrant seals, o-ring seals, and solder seals have been used in prior art designs, but none seems to have ever used electrode-to-glass seals that exceeded 0.125 inches. These small diameters appear to have been preferred to maintain electrode flexibility outside the tube envelope so that the seals themselves would not be over-stressed, but the seals are weak.

The NIF size and complexity has raised the cost of laser glass and laser down time to proportions that require the flashlamps to have zero explosions and zero insulation failures.

All of the highest energy laser facilities have been based on flashlamp-pumped neodymium-doped glass (Nd:glass) lasers because they are most amenable to large-scale deployment and they provide the flexibility in output characteristics needed for ICF and weapons-related experiments.

A highly reliable and a zero explosion flashlamp with a zero failure insulation system is therefore needed now that can operate in regimes never before possible for such an otherwise mature technology.

The re-entrant seal design provides a large reservoir around the lamp lead wire to inject RTV insulation to increase hi-pot resistance and lead-wire termination support.

SUMMARY OF THE PRESENT INVENTION

It is therefore an object of the present invention to provide a pulsed high energy arc-tube flashlamp and seal design with non-conductive structure and one piece mounting base.

It is another object of the present invention to provide a pulsed high energy arc-tube flashlamp with a long shelf life (more than five years).

It is a further object of the present invention to provide a zero explosion lamp structure embodiment.

It is a still further object of the present invention to provide a zero failure lamp insulation system.

It is a still further object of the present invention to provide a simple robust design feature to the lamp seals.

It is a still further object of the present invention to provide a pulsed high energy arc-tube flashlamp with bend-resistant electrodes.

Briefly, a pulsed high energy arc-tube flashlamp embodiment of the present invention comprises a quartz flashlamp envelope that is about 2000 mm long and has an outside diameter of forty-eight mm. Each end necks down to an outside diameter of about thirty-eight mm to accommodate an anode re-entrant seal assembly at one end and a cathode re-entrant seal assembly at the other end. Each anode and cathode comprises a beaded electrode of tungsten with an unusually large 0.25 inch diameter. The thirty-eight mm diameter quartz ends are either gold painted and/or white oxide coated to enhance low voltage triggering and radiation control into the laser amplifier wiring compartment. A TEFLON shrink sleeve is shrunk over each outside end of the flashlamp envelope and such provides a small amount of cushion for the lamp mounts in the laser cassette. No quartz mounting base oversleeves are used intermediate to the outside ends of the flashlamp envelope and the lamp cassette mounts.

An advantage of the present invention is that an arc lamp is provided that eliminates the need for mounting base oversleeves and structures.

Another advantage of the present invention is that an arc lamp is provided that is stronger due its robust monocoque construction.

A further advantage of the present invention is that an arc lamp is provided that reduces the bending moments on the neck of the arc tube.

Another advantage of the present invention is that an arc lamp is provided that increases the Hi-pot standoff voltage.

A still further advantage of the present invention is that an arc lamp is provided that simplifies and improves leadwire joining and insulating.

Another advantage of the present invention is that an arc lamp is provided that provides direct quartz-to-quartz body seals and strong hermetic seals that better resist mounting misalignment bending moments.

Another advantage of the present invention is that the all glass hermetic seal provides long shelf life.

Another advantage of the present invention is that a large diameter arc lamp electrode beaded rod construction is provided that is adaptable to all other quartz-to-tungsten type lamp seals for improved strength.

These and other objects and advantages of the present invention will no doubt become obvious to those of ordinary skill in the art after having read the following detailed description of the preferred embodiment which is illustrated in the drawing figures.

IN THE DRAWINGS

FIG. 1 is a cutaway cross-sectional view of a first arc-tube flashlamp embodiment of the present invention, showing the o-ring cushioned mounting sleeve;

FIG. 2 is a cross-sectional view of an exploded assembly of the anode end of the lamp of FIG. 1;

FIG. 5 is a typical discharge circuit diagram of high-power flashlamp and single flashlamp pair within a laser assembly for advanced inertial confinement fusion.

DETAILED DESCRIPTION OF THE PREFERRED EMBODIMENTS

Figure 3:
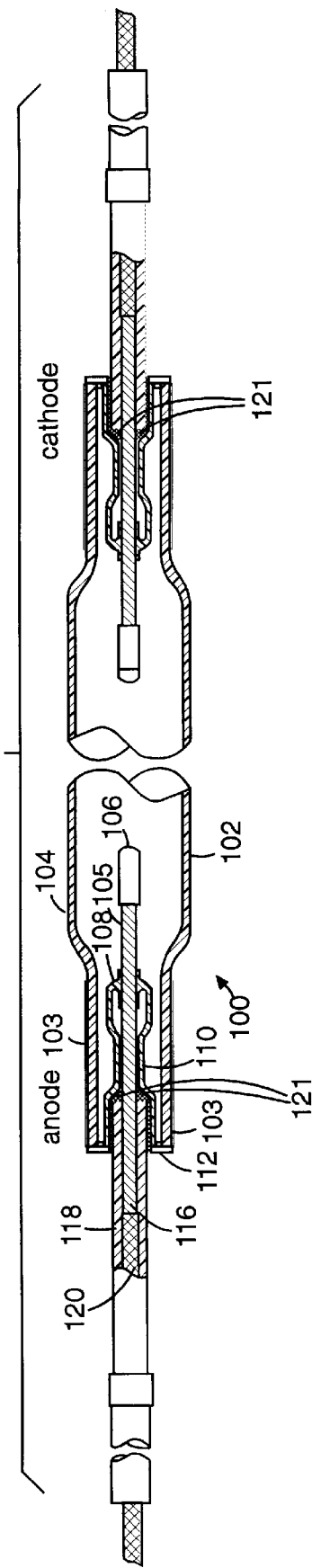
FIG. 3 is a cutaway cross-sectional view of a second arc-tube flashlamp embodiment of the present invention with larger diameter flashlamp envelope ends that do not require the o-ring cushioned mounting sleeve.

FIG. 1 illustrates a first arc-tube flashlamp embodiment of the present invention, referred to herein by the general reference numeral 10. The flashlamp 10 includes a quartz cylindrical envelope 12 that is necked down to a smaller diameter at both an anode end and a cathode end. A beaded anode electrode 14 has a rounded and polished metal cap 16, and is sealed at a bead area 18 to an hourglass-shaped quartz re-entrant seal assembly 20. The anode electrode 14 is preferably comprised of a tungsten electrode beaded rod having a minimum diameter of 0.25 inches, for this size lamp. Such a heavy tungsten rod is critical to the present invention, and compares to prior art designs that are less than 0.125 inches in diameter.

The prior art has universally avoided large diameter wire and electrode exits through the quartz glass envelopes and seals. It had always been assumed that the glass-to-electrode seals were too delicate to permit such large metal rods that had the potential of acting as mechanical levers. The large diameter rods used in embodiments of the present invention improve heat removal from the operating flashlamp and lower the overall electrical impedance. Such concerns are especially critical because of the energy levels used in the flashlamp-pumped lasers such as NIF.

A small gap is included between the tungsten rod of the anode electrode 14 and the inside diameter of the middle neck of the hourglass-shaped quartz re-entrant seal assembly 20 with a flared end that matches the inside of tube envelope 12. Such gap limits the amount that the anode electrode 14 can radially flex at the bead area 18, and prevents breaking the quartz-to-tungsten seal at the bead area 18. This feature allows for axial expansion of the tungsten electrode 14. The end of the envelope 12 is glass-to-glass sealed to the re-entrant seal assembly 20 at a ring area 22. This feature transfers the re-entrant seal bead area to the heavy wall lamp body. A braze joint 26 is covered by a silicone rubber wire cover 28 and connects a wire 30 to the anode electrode 14. Room temperature vulcanizing (RTV) silicone rubber potting compound 31 is injected and potted to the joint.

In a preferred embodiment of flashlamp 10, the overall length of envelope 12 is about 2000 mm, the distance between anode and cathode electrode tips is about 1800 mm, the quartz comprising envelope 12 is about 2.5 mm thick with an outside diameter of about forty-eight mm, and the two opposite smaller diameter ends of the envelope 12 are about twenty-five mm in outside diameter and about one hundred mm in length. For this application the envelope 12 is filled with xenon gas to a cold pressure of from fifty torr to two hundred torr. The flashlamp is operated at approximately thirty-two kilojoules and receives its operating current from a prompt discharge of a large capacitor bank.

The cathode electrode and re-entrant seal assembly is similar to that described for its corresponding anode end, for this and FIG. 3.

FIG. 2 illustrates the anode end of envelope 12, the re-entrant seal assembly 20. All features numbered 22 are ultimately brought together and joined in the ring area 22 shown in FIG. 1. A braze joint is covered by a silicone rubber wire cover and connects a wire. A mechanical shock mount has a pair of o-rings that grip the outside diameter of the oversleeve. The o-rings allow for a small amount of mis-registration to exist between the flashlamp and the laser cassette that it is mounted in.

The mechanical shock mount with o-rings add significant value added and logistics to the overall flashlamp assembly. In applications where the maximum outside mounting diameter at the anode and cathode ends is constrained, such elements necessitate a smaller diameter for the ends of the envelope 12. Such smaller ends reduce the overall strength of the assembly and cause stress risers at the transition in diameters of the envelope that must be annealed out during manufacture.

FIG. 3 illustrates a preferred second arc-tube flashlamp embodiment of the present invention, referred to herein by the general reference numeral 100. Such flashlamp 100 is relatively stronger due to its simple, robust monocoque construction, less complex to manufacture, has high mechanical and electrical reliability and integrity and eliminates the logistics of the mounting sleeves. The flashlamp 100 includes a quartz cylindrical envelope 102 that is necked down to a slightly smaller diameter at both anode and cathode ends. In an application suitable to the DOE NIF at LLNL, the necked down diameter is slightly less than 1.50 inches to accommodate a TEFLON shrink tube 103. Such teflon shrink tube 103 provides a resilient interface between the quartz mounting surface and the cassette mounts. Shrink tube 103 further provides high hi-pot resistance due to its high dielectric strength. Such smaller diameter is only slightly less than the maximum allowed for direct laser cassette mounting, because no shock mount is used. As a result, the envelope ends themselves are very strong and stress risers are eliminated.

A protective coating 104 is applied over the outside of the necked areas of envelope 102. Such coating may comprise a metalic reflective paint to lower the pre-ionization voltage. Aluminum foil and vapor coated mylar tape may be shrunk on using the 103 teflon sleeve to retain them in place. Other coatings of ozone free $TiO_2$ clear solution and/or opaque UV reflective coatings. Such coating 104 also serves to protect the o-ring mounts in a laser cassette and the lamp wiring junction box from the intense radiation generated by the arc. The coating 104 is preferably baked-on prior to the fitting of the TEFLON sleeve 103.

An anode electrode 105 has an extended length metal cap 106 that is rounded and polished. Respective metals caps at the cathode and anode electrodes are preferably comprised of a material that resists electrical arcing wear. The anode electrode 105 is comprised of a 0.25 inch (minimum) tungsten beaded rod and is sealed at a bead area 108 to an hourglass-shaped quartz re-entrant seal assembly 110. Such a heavy tungsten rod is critical to the present invention, and compares to prior art designs that are less than 0.125 inches in diameter. A small gap is included between the tungsten rod of the anode electrode 105 and the inside diameter of the middle neck of the hourglass-shaped quartz re-entrant seal assembly 110. Such gap allows the anode electrode 105 to flex at the bead area 108, but limits any flexing to prevent breaking the quartz-to-tungsten seal at the bead area 108. The end of the envelope 102 is glass-to-glass sealed to the re-entrant seal assembly 110 at a ring area 112. A braze joint 116 is covered by a silicone rubber wire cover 118 and connects a wire 120. Room temperature vulcanizing (RTV) silicone rubber potting compound 121 is injected and potted to the joint.

Figure 4:
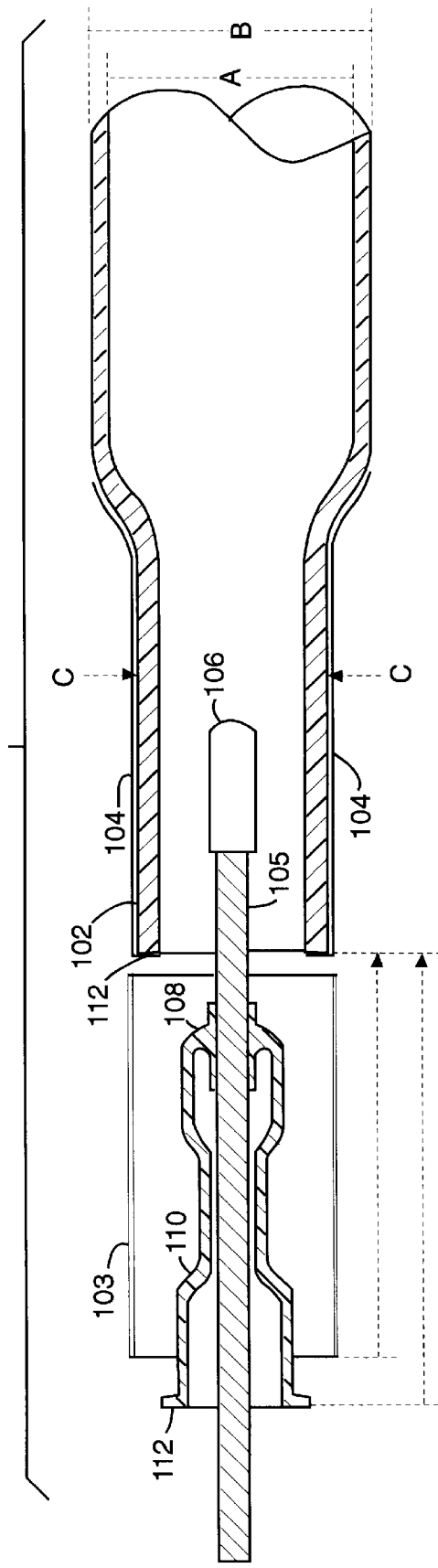
FIG. 4 is a cross-sectional view of an exploded assembly of the anode end of the lamp of FIG. 3.

FIG. 4 illustrates the anode end of the envelope 102, the re-entrant seal assembly 110, and the sleeve 103 in greater detail and in the process of being assembled. All features numbered 112 are ultimately brought together and joined in the cupped ring area 112 shown in FIG. 3. For example, the cupped ring area 112 is filled with RTV prior to insertion of the rubber wire cover 118 and seals the reentrant seal cavity. The RTV provides support for cover 118 and additional hi-pot resistance. Protective coating 104 is extended over end 112 after the seal is made, and before sleeve 103 is installed.

FIG. 5 is a typical flashlamp discharge circuit diagram of high-power flashlamp pair within a laser assembly for advanced inertial confinement fusion refered to herein by the general reference numeral 150. The assembly 150 typically includes 24.0 KV capacitor-charging power supply 152, ignition switch 154, fuse 156, 280 µf 24.0 KV capacitor 158, charge resistor 160, 50.0 µh inductor 162, 4.0 nf 30.0 KV "door knob" cap 164, laser cassette 166, two each in series flashlamps 168 and 170 (shown in FIG. 1), laser medium 172, and ICF target 174.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A flashlamp for pumping a neodymium-doped glass (Nd:glass) laser at kilojoule energy levels, comprising:

a monocoque quartz glass cylindrical envelope with open opposite anode and cathode ends;

a pair of re-entrant quartz glass seal assemblies, one with a cathode electrode and another with an anode electrode; and a middle constraining gap disposed within each of the re-entrant quartz glass seal assemblies that limits the lever movement of its corresponding cathode and anode electrode;

wherein, each cathode and anode electrode comprises a tungsten beaded rod at least 0.25 inches in diameter;

wherein, each re-entrant quartz glass seal assembly is quartz-to-quartz sealed to a ring perimeter of each anode and cathode end; and wherein said anode and cathode ends of the envelope provide sufficient mechanical strength for direct mounting in a laser cassette holder.

2. The flashlamp of claim 1, further comprising:

a pair of anode and cathode wire connections for receiving as much as 20,000 amps at 24,000 volts from a capacitor bank for several hundred microseconds;

wherein an arc between said cathode and anode electrodes provides as much as thirty-two kilojoules of energy.

3. The flashlamp of claim 1, wherein:

each re-entrant quartz glass seal assembly has an hourglass shape in which is coaxially disposed said electrode beaded rod with a glass seal to the assembly at the end disposed innermost to the envelope, and which is sealed at the end opposite to the electrode-beaded-rod seal to the corresponding ends of the envelope.

4. The flashlamp of claim 1, further comprising:

a potting reservoir disposed between and sealing a lead wire insulator to the quartz envelope;

wherein said lead wire is afforded mechanical support and the overall hi-pot resistance is improved.

* * * * *

UNITED STATES PATENT AND TRADEMARK OFFICE
CERTIFICATE OF CORRECTION

PATENT NO.  : 5,898,270
DATED       : April 27, 1999
INVENTOR(S) : George Oiye & Jose B. Soberanes It is certified that error appears in the above-indentified patent and that said Letters Patent is hereby corrected as shown below:

Cover Page - Title should read "MONOCOQUE STRUCTURE AND LARGE ELECTRODE BEADED ROD RE-ENTRANT SEALS FOR FLASHLAMP-PUMPED SOLID-STATE LASER FLASHLAMPS"

Column 1, Title should read "MONOCOQUE STRUCTURE AND LARGE ELECTRODE BEADED ROD RE-ENTRANT SEALS FOR FLASHLAMP-PUMPED SOLID-STATE LASER FLASHLAMPS"

Signed and Sealed this

Seventh Day of September, 1999

*Attest:*

Q. TODD DICKINSON

*Attesting Officer*   *Acting Commissioner of Patents and Trademarks*